United States Patent

Carome

[11] Patent Number: 4,671,113
[45] Date of Patent: Jun. 9, 1987

[54] FIBER OPTIC ACCELEROMETER

[76] Inventor: Edward F. Carome, 3850 Merrymound Rd., South Euclid, Ohio 44121

[21] Appl. No.: 467,264

[22] Filed: Feb. 17, 1983

[51] Int. Cl.$^4$ ............................................ G01P 15/08
[52] U.S. Cl. ........................... 73/516 LM; 73/517 R; 73/705; 250/227
[58] Field of Search ............ 73/515, 516 R, 516 LM, 73/517 R, 517 B, 705, 653, 655; 250/227; 350/96.1, 96.13

[56] References Cited

U.S. PATENT DOCUMENTS

| | | | |
|---|---|---|---|
| 2,726,074 | 12/1955 | Ketchledge | 73/516 LM |
| 4,297,887 | 11/1981 | Bucard | 73/655 |
| 4,395,908 | 8/1983 | Shopland | 73/516 LM |
| 4,408,829 | 10/1983 | Fitzgerald et al. | 73/705 |

Primary Examiner—James J. Gill
Attorney, Agent, or Firm—Fay, Sharpe, Fagan, Minnich & McKee

[57] ABSTRACT

First and second coils (A, B) of optical fibers are disposed adjacent opposite ends of a housing (40). The housing defines an interior reservoir which contains a material (C) having substantial mass. Preferably, the material is a dense fluid such as mercury. Phase coherent light from a laser (10) is transmitted through the first and second optical fiber coils. The phase coherent light passing through the first and second coils is combined by an optical coupler (22). Under acceleration, the pressure to which the mercury subjects the two fiber optic coils varies by a pressure differential that is proportional to acceleration. The pressure differential causes a corresponding elongation and contraction of the optical fiber lengths which, in turn, causes a corresponding optical phase shift. The optical phase shift is detected interferometrically providing optical intensity changes. Photodiodes (30,32) detect the combined light and product electrical signals which vary with changes in the intensity of the combined light. A signal processor (34) translates the detected phase shift into an indication of acceleration for display on an acceleration indicator (36). Optionally, a phase modulator (62) may adjust the phase of the light transmitted through one of the fiber optic coils in such a manner that absent any acceleration, the light transmitted through the first and second fiber optic coils have a preselected phase relationship. Under acceleration an electrical feedback signal is applied to the phase modulator (62) to counter balance the acceleration produced phase shift, in which case the electrical feedback signal is translated into the acceleration indication.

18 Claims, 4 Drawing Figures

FIBER OPTIC ACCELEROMETER

BACKGROUND OF THE INVENTION

This invention relates to the art of accelerometers and more particularly to fiber optic accelerometers.

Heretofore, various types of accelerometers have been used. In one type of accelerometer, a mass is displaced against a spring by the inertial force due to acceleration. The distance which the mass is displaced varies with the acceleration. By monitoring the amount of displacement, the acceleration can be determined. The smaller the acceleration which the prior art acceleration accelerometers are designed to measure, the more sensitive they tend to be to interference. Further, the accuracy of accelerometers is related to the linearity or predictability of the physical changes in response to acceleration. Commonly, it is difficult to maintain the linearity and predictability when measuring relatively small accelerations.

In one prior art fiber optic accelerometer, a mass is positioned in a housing by transverse diaphragms. The mass is suspended between the ends of longitudinally extending tensioned optical fibers. The tensioned optical fibers are secured to the mass and the housing such that under acceleration, the mass elongates one of the fibers and allows the other to contact. Each fiber is mirrored at the end connected to the mass. A laser transmits phase coherent light along both optical fibers toward the mirrored ends. Light reflected from the mirrors is combined and fed to a signal processor or other phase shift detector. The elongation and contraction of the optical fibers caused by acceleration alters the phase relationship of the two reflected light beams. The detected phase shift varies in accordance with the acceleration.

The present accelerometer contemplates a new and improved accelerometer which is capable of measuring small acceleration forces accurately over a wide dynamic range. For example, in the preferred embodiment, the accelerometer is able to measure accelerations on the order of one-millionth the acceleration of gravity.

SUMMARY OF THE INVENTION

In accordance with the present invention, there is provided a two coil, phase modulation fiber optic accelerometer.

In accordance with a more limited aspect of the invention, there is provided an accelerometer having first and second optical fiber coils or lengths acted on by a relatively dense mass, preferably a fluid. The first and second fiber optic lengths are disposed in substantially parallel, planar regions with the mass therebetween. The optical fiber lengths are adapted to be connected with a phase coherent light source, such as a laser, and are adapted for connection with a phase shift detection means. Under acceleration transverse to the parallel planes of the first and second optical fiber coils, the first and second optical fiber coils are subjected to a differential pressure which varies in proportion to acceleration. The pressure causes a corresponding differential length change in the fiber optic lengths which, in turn, causes a shift in the phase relationship of the light passing therethrough. The phase shift varies in proportion to the pressure differential and acceleration.

In accordance with another aspect of the invention, there is provided a fiber optic accelerometer for measuring acceleration along a first axis. First and second lengths of optical fiber are disposed transverse to its first axis. A mass is disposed along the first axis between the first and second optical fiber lengths. A phase coherent light source transmits phase coherent light through the first and second optical fiber lengths. A phase detection means detects a difference or shift in the relative phase of the light transmitted through the first and second fiber optic lengths. An acceleration indictating means transforms the detected phase shift into an indication of acceleration.

A primary advantage of the present invention is that it accurately measures small accelerations.

Another advantage of the present invention is that it is relatively insensitive to interference, particularly electric and magnetic interference.

Yet another advantage of the present invention is that it is strong and stable over a wide range of environmental conditions.

Still further advantages of the present invention will become apparent to those of ordinary skill in the art upon reading and understanding the following detailed description of the preferred embodiment.

BRIEF DESCRIPTION OF THE DRAWINGS

The invention may take form in various parts and arrangements of parts. The drawings are only for purposes of illustrating a preferred embodiment of the invention and are not to be construed as limiting it.

DETAILED DESCRIPTION OF THE PREFERRED EMBODIMENTS

A first fiber optic length A, preferably a first coil and a second fiber optic length B, preferably a second coil, are disposed in substantially parallel planes separated by a distance h. A material C, preferably a fluid, of substantial mass density is disposed between the first and second optical fiber planes.

For light of wave length $\lambda$ passing through a coil of length l and index of refraction n, the total optical phase shift is given by the relationship:

$$\phi = (2\pi n l)/\lambda \qquad (1)$$

Under acceleration, the fluid mass subjects the fiber optic lengths to a pressure differential. For a pair of like fiber optic coils of length l, the relative phase shift $\delta\phi$ is a function of the pressure differential $\delta p$, therebetween, i.e.:

$$\delta\phi = k l \delta p \qquad (2)$$

where k is a constant which relates the phase change per meter of optical fiber to the pressure differential. It is known, for example, that for appropriately selected plastic coated optical fibers, a pressure change of 1 dyne/cm.$^2$ produces a phase shift in light of 1 micron wavelength of the order of $10^{-4}$ radians per meter of optical fiber. In this example, the constant is $10^{-4}$ radians/m./dyne/CM.$^2$. For a fluid mass, the pressure differential, $\delta p$, is related to the acceleration a, the mass density $\rho$, and the distance h between the fiber optic lengths, by the relationship:

$$\delta p = \rho a h \qquad (3)$$

Thus, the acceleration a and a phase shift $\delta\phi$ are related by:

$$\delta\phi = (kl\rho h)a \qquad (4)$$

From these relationships, it can be seen that with a fiber optic length of 10 meters, a mass density $\rho$ of 1 gram per cubic centimeter, an optical fiber spacing h of 1 centimeter and a wave length $\lambda$ of 1 micron, each microradian of phase shift corresponds approximately to $10^{-3}$ cm./sec.$^2$, i.e. one-millionth the acceleration of gravity. It is to be appreciated that the sensitivity of the accelerometer can improved by increasing the length of optical fiber, increasing the density of the mass, increasing the spacing between the optical fiber coils, and decreasing the wave length of the coherent light.

Figure 1:
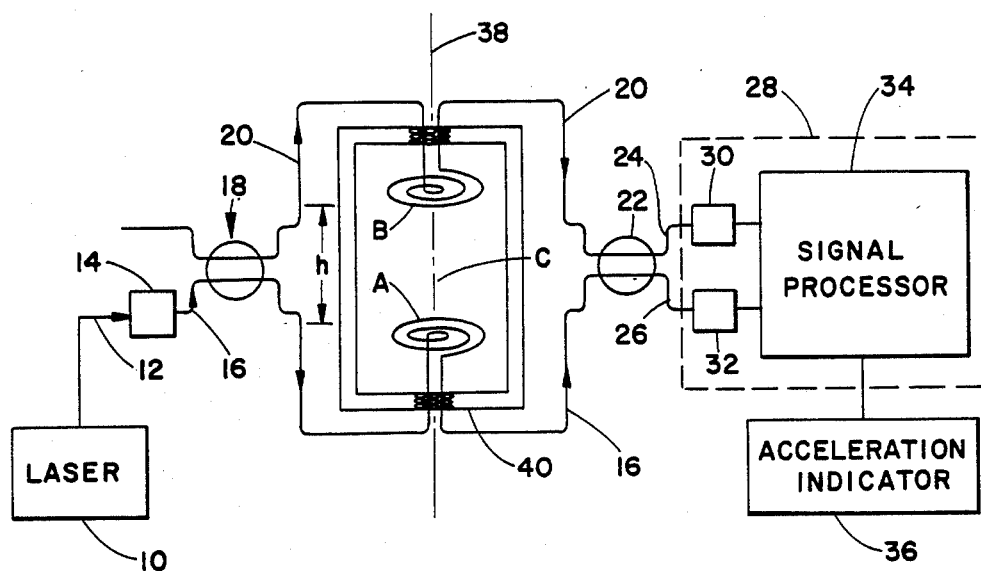
FIG. 1 illustrates a fiber optic accelerometer in accordance with the present invention.

With reference to FIG. 1, a source of phase coherent light, such as a laser 10, produces a beam of phase coherent light 12. A laser to fiber optic coupling means 14 such as a microlensed end of a first length of optical fiber 16, causes the laser light to be transmitted along the first optical fiber 16. An optical beam splitter 18, such as an optical fiber to optical fiber coupler, optically couples the first optical fiber with a second optical fiber 20 such that the light is divided approximately equally between the two fibers. In this manner, phase coherent light is transmitted along the first and second optical fibers. The first optical fiber 16 is optically connected with the first optical fiber length or coil A and the second optical fiber 20 is optically connected with the second optical fiber length or coil B. In the preferred embodiment, the first and second optical fiber lengths are close-packed coils. Alternately, the first and second fiber lengths may be arranged in other patterns which enable a relatively long length of optical fiber to be positioned in a relatively small, generally planar region.

A second optical fiber to optical fiber coupling means 22 combines the light carried on the first and second optical fibers. Combining the phase shifted phase coherent beams of light in the two optical fibers produces optical interference which effects the intensity of the combined, modulated light. A pair of output optical fibers 24 and 26 carry the combined, modulated light from the light combining means 22 to a phase detector means 28 which detects shifts in the phase relationship of the phase coherent light transmitted through the first and second optical fibers. The phase detection means includes a pair of photodectectors 30 and 32, such as photodiodes, which sense the light transmitted on the output optical fibers and produce corresponding electrical signals. The electrical signals are processed by a signal processor 34 which detects changes in the electrical signals. An acceleration indicator means 36 is connected with the signal processor for providing a visual indication of the amount of acceleration corresponding to the changes in the electrical signals, hence the relative phase change in the light from the first and second optical fiber lengths.

The fiber optic lengths A and B are positioned in parallel generally planar regions transverse to an axis 38. The planar regions are disposed generally at opposite ends of a housing 40. The housing provides a reservoir for the material or mass means C. Preferably, the material is a fluid and has a relatively high density, e.g. mercury.

Figure 2:
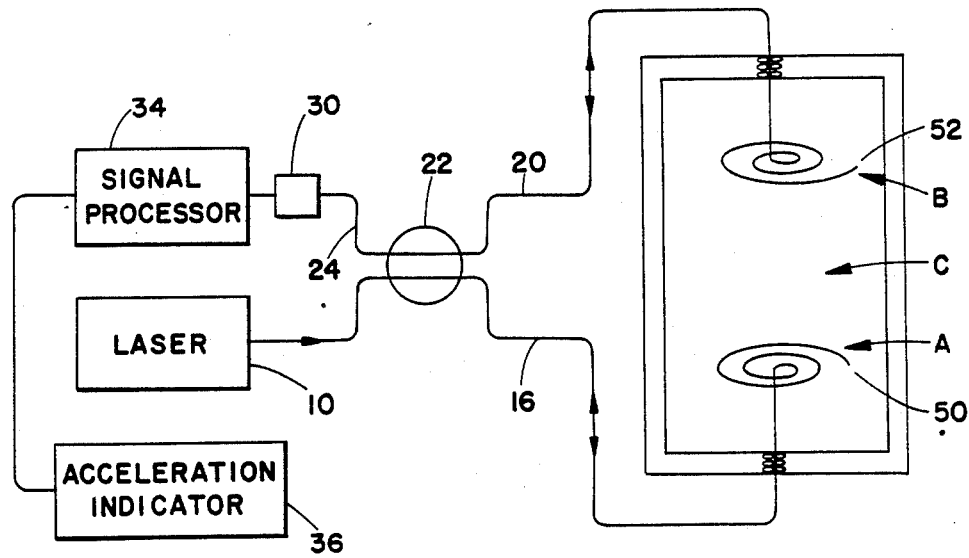
FIG. 2 illustrates an alternate embodiment of an accelerometer in accordance with the present invention.

With reference to the embodiment of FIG. 2, phase coherent light from the laser 10 is transmitted along first and second optical fibers 16 and 20 to the first and second fiber optic lengths or coils A and B, respectively. The fiber optic coils have mirrored end surfaces 50 and 52 which cause the phase coherent light to be reflected. The optical fiber to optical fiber coupling means 22 combines the reflected and unreflected laser light to provide the photodetector 30 with combined, modulated light. The intensity of the modulated light changes with acceleration in a known manner. The intensity changes in the modulated light intensity detected by the photodectector 30 are translated by the signal processor 34 and the acceleration indicator 36 into an indication of acceleration. The signal processor may, for example, compare the intensity changes with a look-up table that is preprogrammed with experimentally determined intensity/acceleration relationships.

Figure 3:
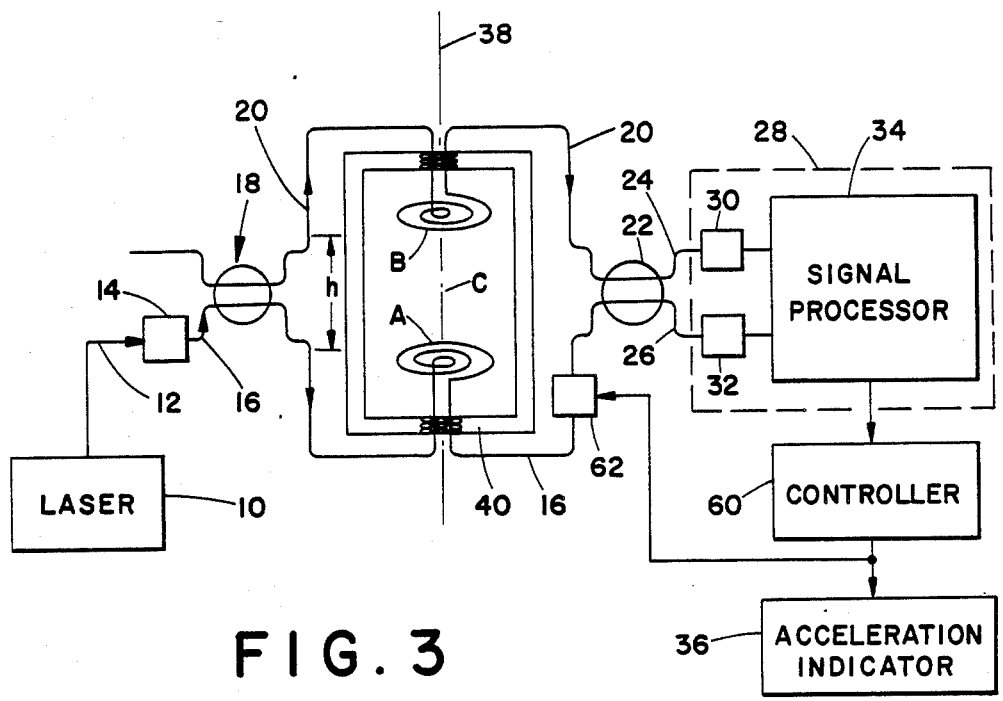
FIG. 3 illustrates another alternate embodiment of a fiber optic accelerometer in accordance with the present invention; and, FIG. 4 illustrates yet another alternate embodiment of an accelerometer in accordance with the present invention.

In the embodiment of FIG. 3, an alternate arrangement of determining the acceleration is provided. Under zero or no acceleration, a central controller 60 adjusts a phase modulator 62 on one of the first and second optic fiber lengths until the photodetectors 30, 32 detect a preselected phase relationship and produce corresponding output signals. Under an acceleration to be measured, the controller 60 adjusts the phase modulator 62 and the acceleration indicator 36 by corresponding amounts until the photodetectors 30 and 32 again detect the preselected phase relationship. In this manner, the acceleration produced phase shift is counter balanced by the phase adjustment produced by the phase modulator 62 which in turn is translated into the acceleration indication by the acceleration indicator.

Figure 4:
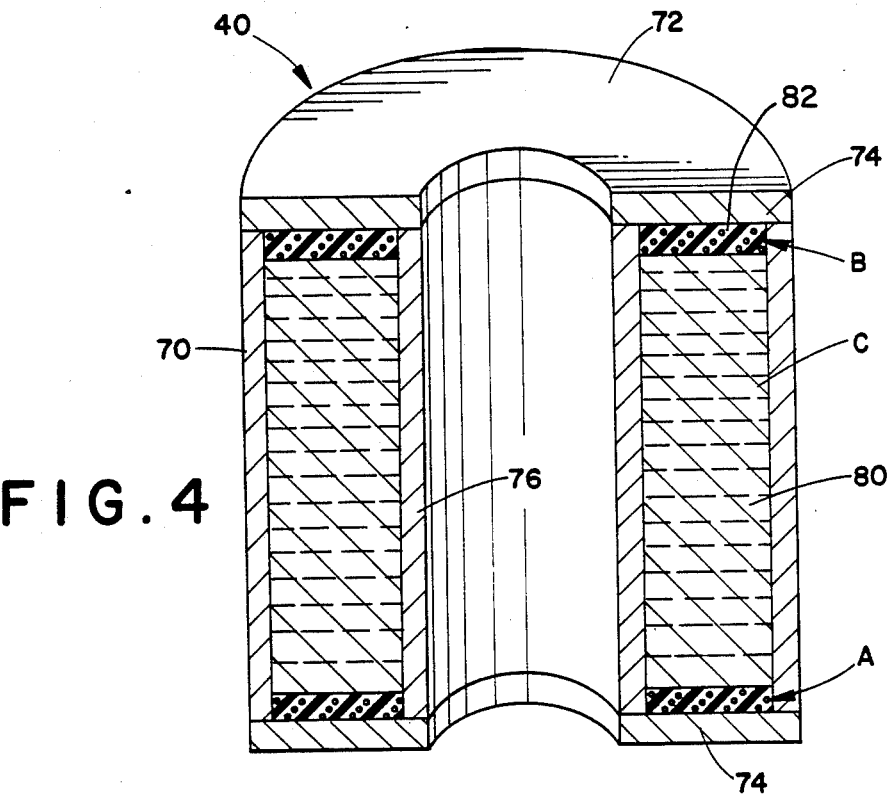

With reference to the embodiment of FIG. 4, the housing 40 is generally tubular being defined by an outer cylindrical wall 70, end walls 72 and 74 and an inner wall 76. The inner and outer walls define a cylindrical cavity 80. The first and second fiber optic lengths include multiple layers of spiral wrapped coils potted in a tetrafluoroethylene or other polymeric acoustooptic coupling material 82. The potting material anchors the fiber optic coils to the end walls to function as support means which supports the two coils and maintains them separated by the constant preselected distance. In the preferred embodiment, the mass means C which fills the cylindrical cavity 80 is mercury.

The invention has been described with reference to the preferred embodiments. Obviously, modifications and alterations will occur to others upon reading and understanding the preceding specification. It is intended that the invention be construed as including all such alterations and modification insofar as they come within the scope of the appended claims or the equivalents thereof.

Having thus described preferred embodiments, the invention is now claimed to be:

1. An accelerometer for measuring acceleration along a first axis, the accelerometer comprising:
    a first length of optical fiber disposed transverse to the first axis;
    a second length of optical fiber disposed transverse to the first axis;

a mass means disposed between the first and second optical fiber lengths such that, under acceleration along the first axis, the first and second optical fiber lengths are subject to pressure which varies between the first and second fiber optic lengths by an acceleration related pressure differential;

a phase coherent light source for transmitting phase coherent light through the first and second optical fiber lengths, the phase coherent light source being operatively connected with the first and second optical fiber lengths;

phase detection means for detecting a change in the phase relationship of phase coherent light transmitted through the first and second optical fiber lengths, the phase detection means being operatively connected with the first and second optical fiber lengths; and, acceleration indicating means for converting the phase shift into an indication of the acceleration along the first axis, the acceleration indicating means being operatively connected with the phase detection means.

2. The accelerometer as set forth in claim 1 wherein the phase detection means includes:

means for combining the phase coherent light transmitted through the first and second fiber optical lengths, such that interference is produced in the intensity of the combined light;

photodetection means for producing electrical signals which vary with changes in the intensity of the combined light, the photodetection means being operatively connected with the combining means;

signal processing means for processing the electrical signals from the photodetection means to produce an output signal which is proportional to the acceleration along the first axis, the signal processing means being operatively connected with the photodetection means; and, wherein the acceleration indicating means converts the output signal from the signal processor to the indication of acceleration.

3. The accelerometer as set forth in claim 1 wherein the first and second optical fiber lengths are disposed in close-packed patterns.

4. The accelerometer as set forth in claim 3 wherein the close patterns are helical coils.

5. The accelerometer as set forth in claim 1 further including a housing, the first and second fiber optic lengths being disposed generally adjacent opposite ends of the housing and the mass being disposed in the housing between the first and second optical fiber lengths.

6. The accelerometer as set forth in claim 5 wherein the mass is a fluid.

7. The accelerometer as set forth in claim 6 wherein the fluid is mercury.

8. The accelerometer as set forth in claim 5 wherein the first and second optical fiber lengths are potted in an acoustooptic coupling medium.

9. The accelerometer as set forth in claim 8 wherein the acoustooptic coupling medium is a polymeric material.

10. The accelerometer as set forth in claim 9 wherein the polymeric material is tetrafluoroethylene.

11. The accelerometer as set forth in claim 1 wherein the first and second optical fiber lengths each have a mirrored end such that light transmitted therethrough is reflected, the phase coherent light source and the phase detection means being operatively connected with the other end of the first and second optical fiber lengths.

12. The accelerometer as set forth in claim 1 further including a phase modulator means disposed along one of the first and second optical fiber lengths for selectively adjusting the phase of the phase coherent light transmitted therethrough.

13. A fiber optic acceleration sensor comprising:

a first optical fiber length disposed in a first generally planar region;

a second optical fiber length disposed in a second planar region, the first and second planar regions being substantially parallel and spaced by a preselected distance;

a support means for supporting the first and second optical fiber lengths spaced by the preselected distance;

a mass means disposed between the first and second optical fiber lengths such that accelerating the support means with a component of motion transverse to the first and second planar regions causes a pressure differential between the pressure exerted on the first and second fiber optic lengths by the mass means;

phase coherent light source connecting means for connecting the first and second lengths with a source of phase coherent light; and, phase detection means for detecting changes in a phase relationship between the phase coherent light transmitted through the first and second lengths.

14. The acceleration sensor as set forth in claim 13 further including a housing defining a reservoir therein, the first and second optical fiber lengths being mounted by the supporting means adjacent opposite ends of the housing and the mass means being disposed in the housing reservoir.

15. The acceleration sensor as set forth in claim 14 wherein the housing reservoir is generally cylindrical, the first fiber optic length is disposed in a generally annular region adjacent one end and the second fiber optic length is disposed in a generally annular region adjacent the other end and the mass means is disposed therebetween.

16. The acceleration sensor as set forth in claim 15 wherein the first and second fiber optic lengths are potted in an acoustooptic coupling medium.

17. The acceleration sensor as set forth in claim 16 wherein the mass means is a fluid.

18. A method of measuring acceleration along a preselected direction, the method comprising transmitting a first beam of phase coherent light from a phase coherent light source along a first light path which is transverse to the predetermined preselected direction;

transmitting phase coherent light from the phase coherent light source along a second light path transverse to the preselected direction;

under acceleration, elongating the first phase coherent light path and contracting the second phase coherent light path such that the elongation and contraction are related to the acceleration;

determining a change in the phase relationship of the phase coherent light which has traversed the first and second phase coherent light paths, the phase change being related to the acceleration along the preselected direction; and, converting the detected change in the phase relationship into an indication of acceleration.

* * * * *